(12) United States Patent
Rune et al.

(10) Patent No.: US 8,098,668 B2
(45) Date of Patent: Jan. 17, 2012

(54) METHODS AND ARRANGEMENTS FOR LAN EMULATION COMMUNICATIONS

(75) Inventors: Johan Rune, Lidingö (SE); Tony Larsson, Upplands Väsby (SE); Mattias Pettersson, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 463 days.

(21) Appl. No.: 12/516,057

(22) PCT Filed: Nov. 23, 2006

(86) PCT No.: PCT/SE2006/050501
§ 371 (c)(1),
(2), (4) Date: May 22, 2009

(87) PCT Pub. No.: WO2008/063110
PCT Pub. Date: May 29, 2008

(65) Prior Publication Data
US 2010/0046524 A1     Feb. 25, 2010

(51) Int. Cl.
*H04L 12/28* (2006.01)

(52) U.S. Cl. .................. 370/395.53; 370/400; 370/401
(58) Field of Classification Search .................. None
See application file for complete search history.

(56) References Cited

U.S. PATENT DOCUMENTS

| | | | |
|---|---|---|---|
| 7,190,678 B2* | 3/2007 | Thubert et al. | 370/254 |
| 7,768,980 B1* | 8/2010 | Henry et al. | 370/338 |
| 8,005,049 B2* | 8/2011 | Cheng et al. | 370/331 |
| 2004/0165600 A1* | 8/2004 | Lee | 370/395.53 |
| 2010/0195620 A1* | 8/2010 | Cheng et al. | 370/331 |

* cited by examiner

*Primary Examiner* — Michael J Moore, Jr.

(57) ABSTRACT

LAN emulation in a moving network environment is disclosed. An emulated LAN encompassing a number of moving networks is formed by means of a set of layer 2 tunnels that interconnect a home agent with mobile routers in the moving networks. The home agent and the mobile routers are arranged to perform layer 2 forwarding over the layer 2 tunnels in order to form the emulated LAN. The layer 2 tunnels can be established in a number of alternative ways. The moving networks that are part of the emulated LAN may move, i.e. change their points of attachment to the network infrastructure, in a dynamic fashion without disrupting the function of the emulated LAN.

20 Claims, 9 Drawing Sheets

METHODS AND ARRANGEMENTS FOR LAN EMULATION COMMUNICATIONS

FIELD OF THE INVENTION

The present invention relates to methods and arrangements for local area network (LAN) emulation in telecommunications systems, and more particularly, to methods and arrangements for LAN emulation in a telecommunications environment comprising one or several moving networks.

BACKGROUND

LAN emulation is a concept that is used to interconnect physically different networks that are separated by one or more routers and still make them appear to the connected hosts as a single layer 2 network, e.g. an Ethernet LAN. Connected hosts will then benefit from the advantages of having other nodes, servers, etc., connected to the same layer 2 network. This includes e.g. being able to use multicast and broadcast protocols, e.g. service discovery protocols, in a well-known home LAN environment.

According to existing technology an emulated LAN is created by setting up a mesh of layer 2 tunnels between edge routers in the involved networks, so that layer 2 frames can be transported transparently between the networks. One tunneling mechanism that can be used for this purpose is described in "Pseudo Wire Emulation Edge-to-Edge (PWE3) Architecture" by S. Bryant et al., published in March 2005 as Request For Comments 3985 by the Internet Engineering Task Force. According to this mechanism the essential attributes of a telecommunications service (such as Frame Relay, ATM, Ethernet or TDM) are emulated over a packet switched network. Service specific bit streams, cells or packets are encapsulated and carried in layer 2 tunnels between different Customer Edge Equipment (CE). The CEs will be unaware of the emulated service. They will experience the emulated service as an unshared link or circuit of the particular service that is being emulated.

The existing solutions for LAN emulation are designed for a static environment with fixed networks being interconnected. When the dynamic environment of moving networks is introduced the solutions run into problems. There are no mechanisms for dynamically updating the layer 2 tunnels to networks that move between different points of attachment and, similarly, the solutions are not adapted to handle interconnected networks that may connect and disconnect in a more or less arbitrary fashion.

A moving network is defined as a network that is movable in relation to its home network. A moving network can change its point of attachment to a fixed infrastructure or it may have many points of attachment to a fixed infrastructure, but it is still able to communicate with a home network through a mobile router having access to an external access through which all communication nodes in the moving network can communicate. Such a communication node in a moving network is called a moving network node (MNN). In the case of a moving network on e.g. an airplane, the moving network will comprise communication nodes, which may be different users' communication devices, such as laptops, mobile phones, PDAs (Personal Digital Assistants) etc., which communication nodes use wireless or wireline communication to communicate with a mobile router (MR) within the airplane, such that all communication destined to an external address will pass via the mobile router. A moving network may also be e.g. a Personal Area Network (PAN), wherein a PAN comprises all communication devices belonging to a user and situated within short range radio communication distance from each other. In this application, each node in the moving network or connected to the moving network that works like a router for data originating from a moving network node and destined to an address external of the moving network is defined as a mobile router. Examples of such mobile routers are: a PAN device working as a router in a PAN, and a router in a moving network on a vehicle. Note that a node may have both roles, i.e. being both a moving network node and a mobile router, for example a PAN device such as a mobile phone in a PAN.

"The Network Mobility (NEMO) Basic Support Protocol", by Devarapalli et al, published in January 2005 as a Request For Comments (RFC) 3963 by the Internet Engineering Task Force, identifies a protocol that enables a moving network to attach to different points in the Internet. The protocol is an extension of Mobile IPv6, and allows session continuity for every communication node (or communication device) in the moving network as the moving network moves. It allows a mobile router to maintain a stable network address prefix for a moving network, even as the mobile router changes its, and thus the moving network's, point of attachment to a fixed network infrastructure. This prefix stability is achieved through a solution similar to the Mobile IPv6 solution, i.e. by making a home agent (HA) in the home network of the mobile router a fixed point of presence for the Mobile Router (MR) and maintaining connectivity between the HA and the MR through a tunnel. The address prefix, which is called mobile network prefix (MNP) in the NEMO protocol, is allocated from the address range of the home network, and can thus remain the same even as the MR and its network move. When the MR attaches to a network in a new location, it acquires a new care-of address in the new network, which care-of address is used to locate the MR in the new network, but its home address and address prefix are unchanged. However, just like in Mobile IPv6 the MR has to register its new care-of address in the HA in order to maintain the tunnel between the Mobile Router and the Home Agent. In the NEMO basic support protocol the MNNs will not change their configuration as the MR changes its point of attachment. In other words, the mobility is transparent to the MNNs.

SUMMARY OF THE INVENTION

Emulated LANs covering moving networks would be beneficial for several reasons. They would allow mobile users, and groups of mobile users, to leverage the general benefits of LAN emulation, e.g. by being virtually present on the home LAN.

As mentioned above existing solutions for LAN emulation are not designed to cope with the dynamic environment of moving networks. An object of the present invention is therefore to provide methods and arrangements that are suitable for emulating one or several LANs that encompass one or several moving networks.

The above stated object is achieved by means of a home agent, a mobile router, a telecommunications system, and a method for local area network emulation, having the features defined in the independent claims.

The basic idea of the present invention is to set up an emulated LAN by means of a set of layer 2 tunnels between a home agent and at least one mobile router of a moving network and adapt the home agent and mobile router(s) so that they can act as layer 2 devices. Implementation of the basic idea of the present invention requires new methods and arrangements, which are all provided according to different aspects of the present invention.

According to a first aspect the present invention provides a home agent for use in a telecommunications system that comprises at least one moving network. The moving network(s) each has at least one mobile router, a number of which belongs to the home agent. The home agent comprises a layer 2 frame forwarding mechanism and is arranged to be a part of an emulated local area network. The emulated local area network encompasses a set of moving networks and is formed by a set of layer 2 tunnels that interconnects the home agent with at least one of the mobile routers of each of the moving networks of the set of moving networks. The home agent is furthermore arranged to maintain a tunnel interface of each tunnel of the set of layer 2 tunnels.

According to a second aspect the present invention provides a mobile router for use in a moving network. The mobile router comprises a layer 2 frame forwarding mechanism, and a first tunnel interface of a layer 2 tunnel, which layer 2 tunnel has a second tunnel interface in a home agent of the mobile router. The layer 2 tunnel belongs to a set of layer 2 tunnels used to form an emulated local area network that encompass a set of moving networks. For this purpose the set of layer 2 tunnels interconnects the home agent with at least one of the mobile routers of each of the moving networks of the set of moving networks.

According to a third aspect the present invention provides a telecommunications system comprising at least one moving network and at least one home agent. Each moving network has at least one mobile router and a number of the mobile router(s) belongs to a home agent in the system. The telecommunications system further comprises an emulated local area network, encompassing a set of moving networks. The emulated local area network is formed by a set of layer 2 tunnels that interconnects a first home agent with at least one mobile router of each moving network of the set of moving networks. The first home agent comprises a layer 2 frame forwarding mechanism and is arranged to maintain a tunnel interface of each tunnel of the set of layer 2 tunnels. The at least one mobile router of each moving network of the set of moving networks comprises a layer 2 frame forwarding mechanism and is arranged to maintain a tunnel interface of a single tunnel of the set of layer 2 tunnels.

According to a fourth aspect the present invention provides a method for local area network emulation in a telecommunications system comprising at least one moving network and at least one home agent. Each moving network has at least one mobile router and a number of the mobile router(s) belongs to a home agent in the system. The method comprises setting up an emulated local area network, encompassing a set of the moving networks by means of establishing a set of layer 2 tunnels that interconnects a first home agent with at least one mobile router of each moving network of the set of moving networks. The set of layer 2 tunnels is established such that the first home agent maintains a tunnel interface of each tunnel of the set of layer 2 tunnels and such that the at least one mobile router of each moving network of the set of moving networks maintains a tunnel interface of a single tunnel of the set of layer 2 tunnels.

An advantage of the present invention is that it enables emulated LANs to be maintained in the dynamic environment of moving networks. Moving networks that are part of an emulated LAN established according to the principles of the present invention may move (i.e. change their points of attachment to the network infrastructure), connect and disconnect in a dynamic fashion. Thus mobile users can be virtually present in a home LAN without having to sacrifice the convenience and flexibility of their mobile behavior.

Another advantage is that the nodes in a moving network in an emulated LAN established according to the principles of the present invention may benefit from the advantages of having other nodes, servers, etc., connected to the same layer 2 network. This includes e.g. being able to use multicast and broadcast protocols, e.g. service discovery protocols, in a well-known home LAN environment.

By means of an emulated LAN incorporating a moving network according to the present invention it is possible for a mobile user to access a home network and use layer 2 based UPnP (Universal Plug and Play) mechanisms for service discovery.

Another appealing possible use of the present invention in the area of home (residential) LANs is to logically interconnect family cars with each other and with the home LAN to form a single emulated LAN. This would for instance make devices in family cars, e.g. multimedia players appear as logically present in the home LAN and also available from one car to another. Furthermore, by means of the present invention it is possible for an organization to keep its mobile networked devices (e.g. the PANs (Personal Area Networks) of mobile sales and marketing staff or other mobile personnel) continuously attached to the same emulated LAN.

A further advantage of the present invention is that it facilitates Ethernet based communication, which is in line with one of the trends for simplifying and reducing the cost of packet based communication.

Yet a further advantage of the present invention is that the nodes inside the moving networks of an emulated LAN (and other nodes in the emulated LAN, e.g. additional nodes in the home network) will always experience the same reachability between each other and also towards the Internet when the emulated LAN is established according to the principles of the present invention.

It is furthermore advantageous that the present invention allows for extension of an emulated LAN outside a HA and the home network of the HA to incorporate other networks, such as a service provider's network. Incorporating the servers and services of a service provider's network in the emulated LAN increases the advantages of the emulated LAN in general and provides additional benefits by facilitating solutions for service provision and delivery similar to those being deployed in fixed broadband networks.

Another advantage of the present invention is that it has no impact on the MNNs in terms of new requirements on functions or behavior. The solution is implemented solely in the involved MRs and HAs. This is an important property of the invention to avoid backwards compatibility problems and other deployment problems, since potential MNNs are numerous and hard to control in terms of implemented software, whereas MRs and HAs are few and assumedly under administrative control.

In addition it is advantageous that the present invention is applicable both in combination with IPv6 and IPv4, and it may furthermore be possible to adapt embodiments of the present invention to future versions of the internet protocol, the NEMO basic support protocol and other corresponding protocols.

Further advantages and features of embodiments of the present invention will become apparent when reading the following detailed description in conjunction with the drawings.

DETAILED DESCRIPTION

Figure 1:
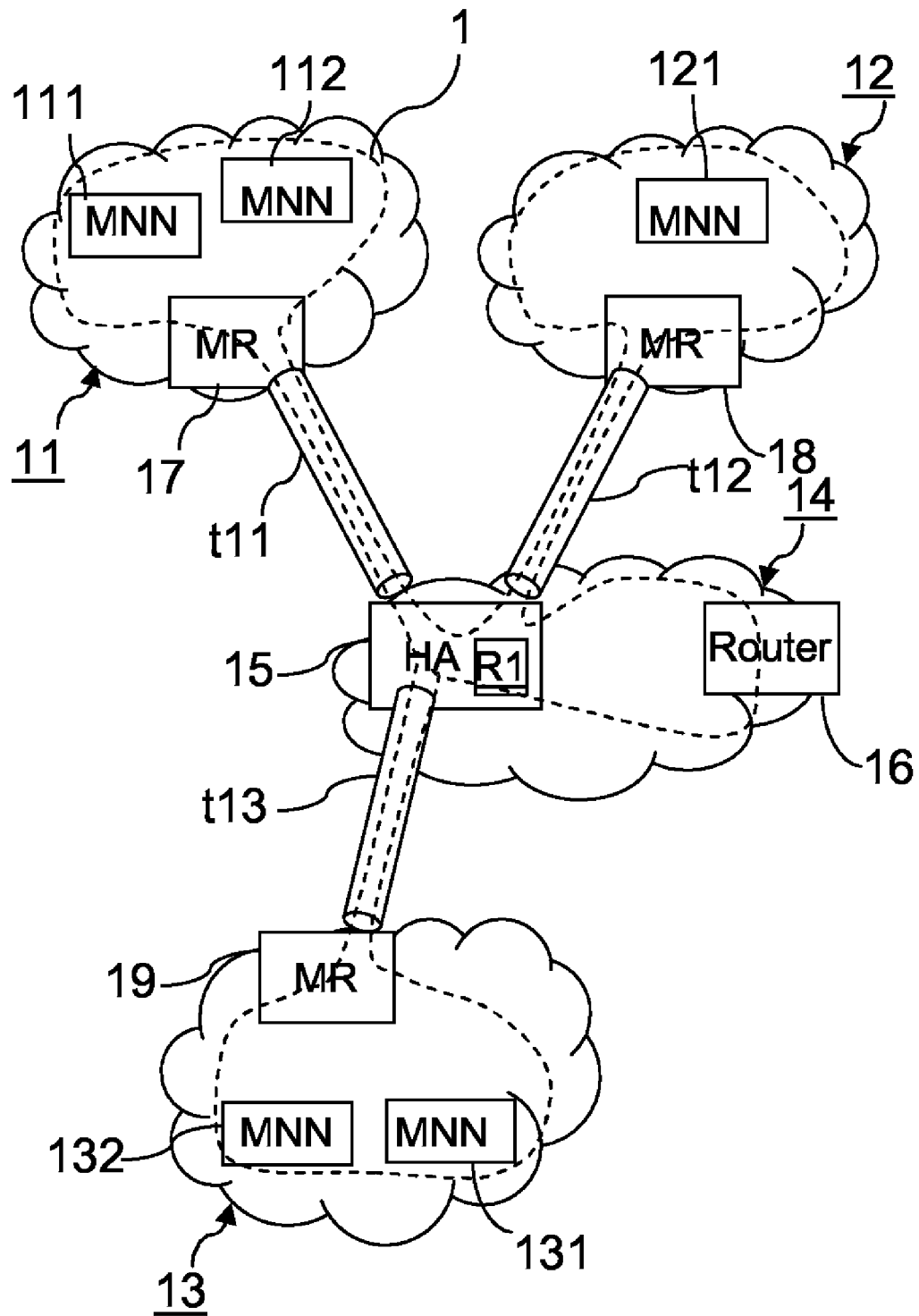
FIG. 1 is a schematic block diagram of an emulated local area network (ELAN), which encompasses three moving networks and illustrates an embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

For the understanding of the following detailed description of the present invention and different embodiments the interpretation of a number of terms are important:

The term Home Agent (HA) used in the application should be interpreted as any node in a home network working like a mobile anchor point to a moving network, i.e. facilitating communication from the moving network over an external network and the home network.

A MR is herein said to "belong" to a HA if it has a regular security relation with the HA. A HA's MRs are the set of MRs that belong to the HA.

In order to understand the present invention it is furthermore important to have basic knowledge about the Open Systems Interconnection (OSI) reference model, which is well known to the person skilled in the art. Particularly reference will be made to layer 2, which is the Data Link layer of the OSI model and layer 3, which is the Network layer of the OSI model.

The basic concept of the present invention is to enable emulated LANs in the dynamic environment of moving networks by means of making use of mobility support functions such as those provided by NEMO. It would however not be enough to rely on the stable point of presence of a moving network represented by its home agent (HA). The reason is that the HA and a moving network are separated on layer 3, with both the HA and the mobile router (MR) (i.e. the node handling the external communication of the moving network) acting as routers. Hence, according to the present invention, both the HA and the MRs that should be involved in an emulated LAN will emulate layer 2 devices and be interconnected by layer 2 tunnels. An example of an emulated LAN according to the basic concept of the invention is illustrated in FIG. 1.

FIG. 1 shows an emulated LAN 1 which encompasses three moving networks 11, 12, and 13. The moving networks 11, 12, 13 all have the same home agent 15. The emulated LAN 1 is illustrated to also encompass a home network 14 of the home agent 15, however it is possible to set up the LAN so that it only covers the home agent 15 and no other nodes 16 of the home network. The emulated LAN is formed by means of a set of layer 2 tunnels t11, t12 and t13. The layer 2 tunnels interconnect a mobile router 17, 18, 19 of each of the moving networks 11, 12, 13 with the home agent 15.

The present invention aims at enabling interconnection of a number of moving networks in a manner that makes the interconnected moving networks appear as a single layer 2 network to the moving network nodes (MNNs) connected to the moving networks. In other words the present invention aims at enabling an emulated LAN comprising a number of moving networks, as illustrated in FIG. 1. In the emulated LAN 1 illustrated in FIG. 1 all the involved moving networks 11, 12, 13 are connected to the same HA 15. The involved MRs 17, 18, 19 should normally be configured with, or be assigned by the HA 15, the same network prefix(es) (MNP(s)). However, emulated LANs involving multiple HAs as well as emulated LANs in which different MRs use different MNPs are also conceivable according to the present invention.

According to the present invention the HA will be assigned a central role in the LAN emulation and will act as a "spider" in a "dynamic web of moving networks". According to embodiments of the present invention the HA keeps track of the moving networks involved in a LAN emulation and acts as a layer 2 switch between them. In order to form a continuous layer 2 environment, the MRs also act as layer 2 devices, but in case of the MRs the term layer 2 bridge is more appropriate than switch (a switch is basically an advanced bridge with more ports).

In order to act as layer 2 devices the HA 15 and the MRs 17, 18, 19 must be adapted to include layer 2 frame forwarding mechanisms. It is also advantageous to adapt the HA 15 and the MRs 17, 18, 19 to employ other mechanisms that are normally found in layer 2 interconnection devices such as use of the Spanning Tree protocol to avoid broadcast loops, and MAC address learning to eliminate redundant frame forwarding in order to save network capacity.

The layer 2 tunnels t11, t12, t13 between the MRs 17, 18, 19 and the HA 15 can be established in several different ways. Three different alternatives will now be discussed and explained in connection with FIGS. 2, 3 and 4.

Figure 2:
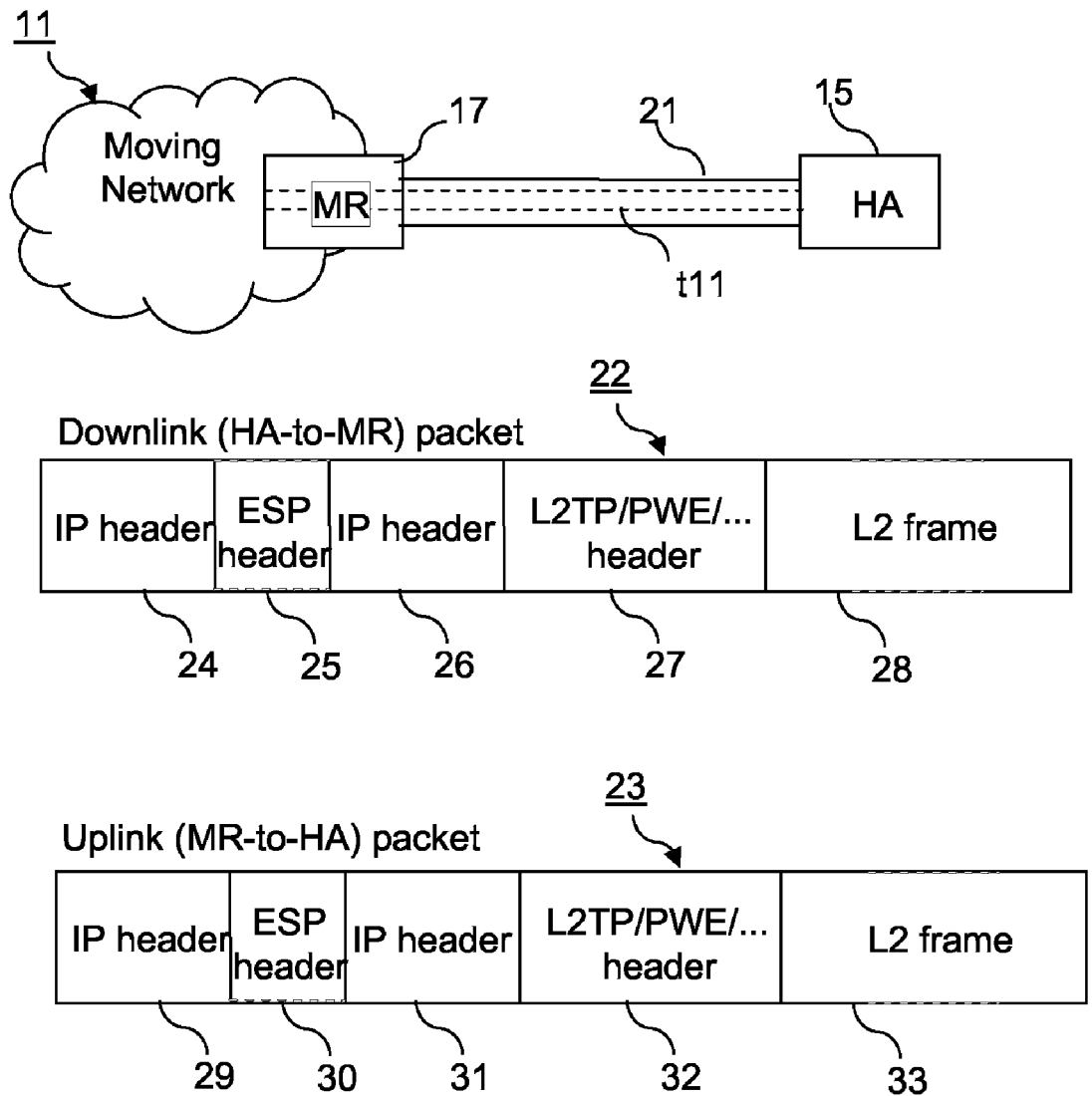
FIG. 2 is a schematic diagram illustrating a first alternative way of establishing a layer 2 tunnel according to an embodiment of the present invention.

FIG. 2 illustrates schematically a first alternative way of establishing the layer 2 tunnel t11. According to this alternative the layer 2 tunnel t11 is established through a regular NEMO MR-HA tunnel 21 with one tunnel endpoint being a HA address (i.e. coinciding with the NEMO MR-HA tunnel endpoint) and the other tunnel endpoint being an address at the ingress interface (i.e. the interface towards the moving network 11) of the MR 17. FIG. 2 also illustrates the structure of a downlink packet 22 i.e. a packet transmitted from the HA 15 to the MR 17 and the structure of an uplink packet 23 i.e. a packet transmitted from the MR 17 to the HA 15 when the layer 2 tunnel t11 is established according to this first alternative. The downlink packet 22 comprises an IP header 24 including a care-of-address of the MR 17, which represents a tunnel endpoint of the NEMO tunnel 21, an optional IPsec header (in this case an optional Encapsulating Security Payload (ESP) header) 25, an IP header 26 including the address at the MR ingress interface which represents the tunnel endpoint of the layer 2 tunnel t11, a layer 2 tunnel header 27, and the actual layer 2 frame 28. The uplink packet 23 comprises an IP header 29 including an address of the HA 17, which represents a tunnel endpoint of the NEMO tunnel 21, an optional IPsec header 30, an IP header 31 including the address at the HA which represents the tunnel endpoint of the layer 2 tunnel t11, a layer 2 tunnel header 32, and the actual layer 2 frame 33.

Figure 3:
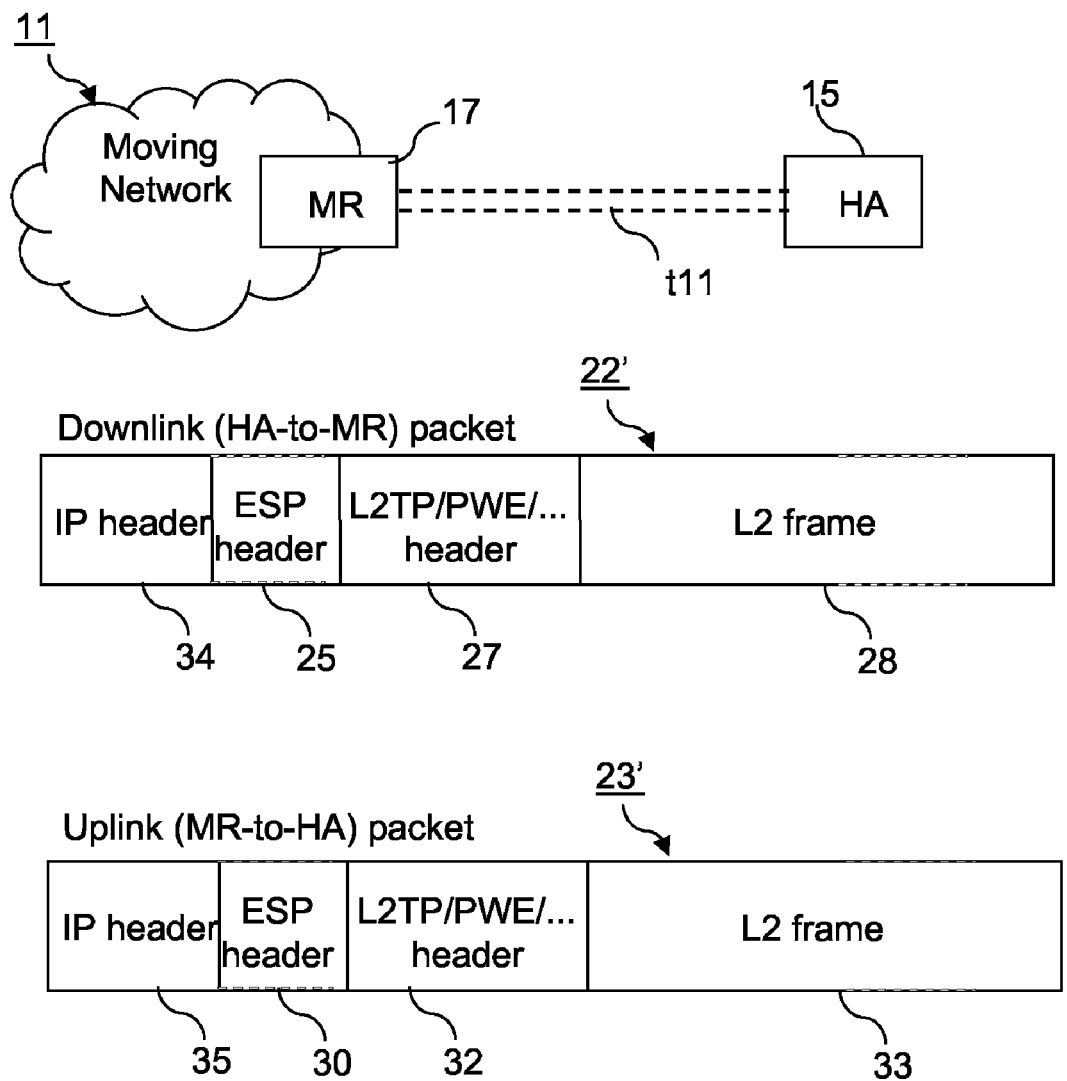
FIG. 3 is a schematic diagram illustrating a second alternative way of establishing a layer 2 tunnel according to an embodiment of the present invention.

FIG. 3 illustrates schematically a second alternative way of establishing the layer 2 tunnel t11. According to this alternative the layer 2 frame forwarding is employed directly through a NEMO MR-HA tunnel. In one sense this is equivalent to replacing the regular NEMO MR-HA tunnel with the layer 2 tunnel t11 having endpoints in an address of the HA 15 and the MR's 17 care-of address (i.e. an address at the MR's 17 egress interface). However, according to this second alternative NEMO/MIPv6 mobility mechanisms are still used for the tunnel t11. An advantage of this second alternative over the first alternative above is that the additional tunnel overhead of the tunnel-in-tunnel principle is avoided. FIG. 3 also illustrates the structure of a downlink packet 22' and the structure of an uplink packet 23' when the layer 2 tunnel t11 is established according to this second alternative. The downlink packet 22' comprises an IP header 34 including the care-of-address of the MR 17, which represents a tunnel endpoint of the layer 2 tunnel t11, an optional IPsec header 25, a layer 2 tunnel header 27, and the actual layer 2 frame 28. The uplink packet 23' comprises an IP header 35 including the address of the HA 17, which represents a tunnel endpoint of the layer 2 tunnel t11, an optional IPsec header 30, a layer 2 tunnel header 32, and the actual layer 2 frame 33.

Figure 4:
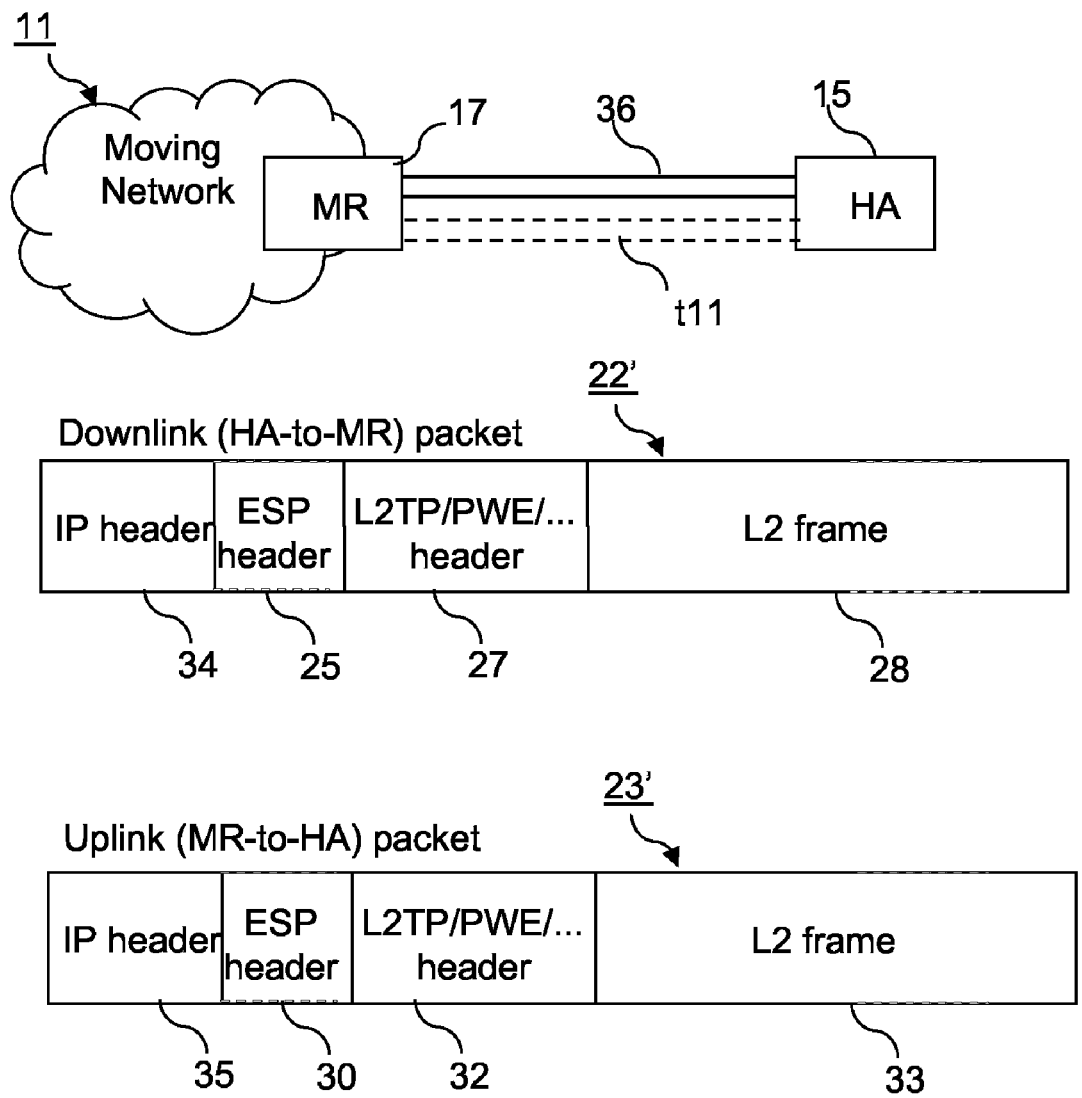
FIG. 4 is a schematic diagram illustrating a third alternative way of establishing a layer 2 tunnel according to an embodiment of the present invention.

FIG. 4 illustrates schematically a third alternative way of establishing the layer 2 tunnel t11. According to this alternative the layer 2 tunnel t11 is established as in the second alternative above (protected by IPsec if desired), but with a regular NEMO MR-HA IP-in-IP tunnel 36 in parallel. The two tunnels t11, 36 share the same endpoint addresses. The advantage of this third alternative compared to the second alternative is that the MR 17 can act as a layer 2 bridge and as an edge router of the moving network 11 simultaneously. An example of a scenario where this could be useful is when external consultants are connected to the moving network 11 and the moving network 11 belongs to a corporation and the corporation does not want the consultants to have unlimited access to the emulated LAN 1. The MR's 17 bridge emulating function could filter out traffic from the consultants and instead let them access the network infrastructure through the regular NEMO MR-HA tunnel 36. When the layer 2 tunnel is established according to this third alternative the downlink and uplink packets 22' and 23' will have the same structure as for the second alternative described above, as illustrated in FIG. 4.

Examples of possible layer 2 tunneling protocols that can be used include e.g. the Pseudo Wire Emulation (PWE) protocol described in "Pseudo Wire Emulation Edge-to-Edge (PWE3) Architecture" by S. Bryant et al., published in March 2005 as RFC 3985 by the IETF, and the Layer 2 Tunneling Protocol (L2TP) described in "Layer Two Tunneling Protocol—Version 3 (L2TPv3)" by J. Lau et al. published in March 2005 as RFC 3931 by the IETF.

The HA 15 shown in FIG. 1 is according to this embodiment of the present invention adapted to maintain a record R1 of which MRs 17, 18, 19 and which tunnels t11, t12, t13 that belong to the emulated LAN (ELAN) 1. The HA 15 acts as a layer 2 switch with interfaces towards each tunnel t11, t12, t13 in the ELAN 1. Thus the HA forwards layer 2 frames (e.g. Ethernet frames) arriving through the MR-HA tunnel t11 to the appropriate one(s) of the other MR-HA tunnels t12, t13. The choice of the MR-HA tunnels to forward a frame through is subject to the Spanning Tree protocol and the MAC address learning mechanism and may range from zero MR-HA tunnels to all but the one through which the frame arrived. It is also possible to use Virtual LANs (VLANs) within the ELAN 1, which in that case also affects the choice of MR-HA tunnels to forward a frame through.

When a MR-HA tunnel t11, t12, t13 is disconnected, e.g. because the HA 15 looses contact with the MR 17, 18, 19 or because the MR's binding in the HA 15 times out, the HA 15 must update its record R1 for the ELAN 1 accordingly. The record also has to be updated when a new MR-HA tunnel is established. Movements, which are reflected in the HA as updates of an MR's care-of address, may also trigger record updates. The inherent mobility support of NEMO/MIPv6 ensures that the affected MR-HA tunnel t11, t12, t13 is redirected to the new care-of address. If this redirection requires creation of a new tunnel interface in the HA 15, then the record R1 for the concerned ELAN has to be updated—otherwise not.

Figure 5:
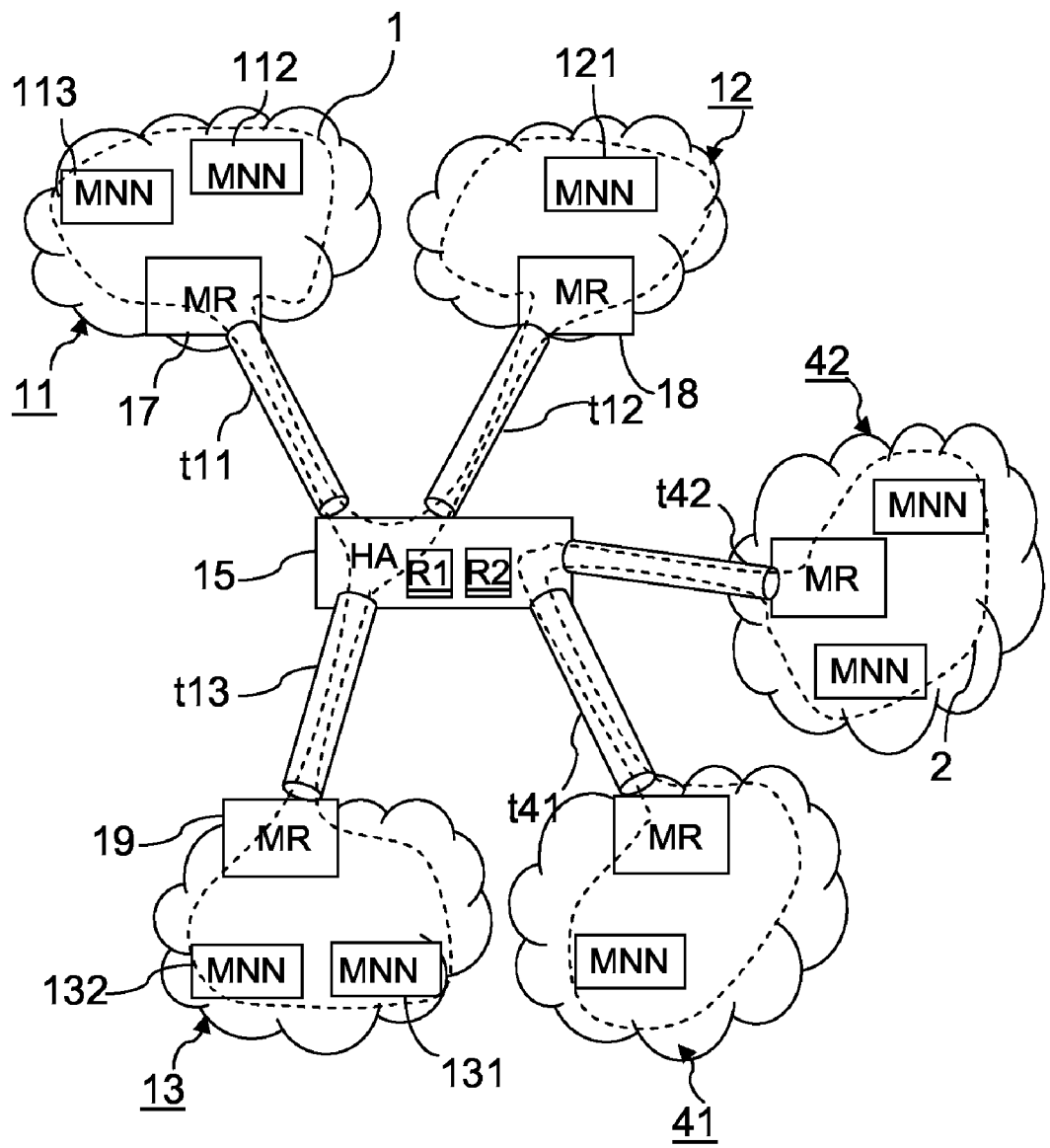
FIG. 5 is a schematic block diagram illustrating an alternative embodiment of the present invention in which one home agent serves two ELANs simultaneously.

The HA 15 may serve several ELANs 1, 2 simultaneously, as illustrated in FIG. 5, in which case multiple records R1, R2 are needed to keep track of them and to avoid accidental "frame leaking" between them In FIG. 5 it is illustrated that the HA 15 apart from the ELAN 1 also serves the ELAN 2 which encompasses two moving networks 41 and 42 and comprises layer 2 tunnels t41 and t42. The HA 15 is not limited to handling two ELANs simultaneously. It can be arranged to handle more than two ELANs and the ELANs may also overlap as will be explained in further detail below. The HA 15 may serve the multiple ELANs 1, 2 through multiple instances of "virtual switches" or by separating the different ELANs 1, 2 using port based VLANs within a single virtual switch instance.

The moving networks 11, 12, 13 of the ELAN 1 may go through splits and mergers. In order to obtain a loop-free frame distribution in all parts of the ELAN 1 the HA 15 should react to splits and mergers among the moving networks 11, 12 and 13. Employment of the Spanning Tree protocol ensures this. However, in order to improve the convergence time after topology changes, the Spanning Tree protocol may be complemented with additional mechanisms. As an additional loop avoidance mechanism the MRs 17, 18, 19 may be arranged respectively to cache each layer 2 frame that they forward through a layer 2 tunnel for a certain time. The MR 17, 18, 19 would check its frame cache for each frame that it is about to forward through a layer 2 tunnel and discard the frame if it already exists in the cache. The time a frame remains in the cache should preferably be short, in order not to waste memory. More importantly, though, in order for the cache to serve its purpose, without interfering with the protocols used in the ELAN 1, the cache timeout must exceed a frame's maximum possible "lifetime" in the ELAN 1, but must be shorter than any retransmission interval in a protocol used in the ELAN 1 (e.g. for retransmission of Neighbor Solicitation messages during Duplicate Address Detection or retransmission of TCP packets). The HA 15 could also use frame caching to avoid forwarding the same frame twice through the same layer 2 tunnel t11, t12, t13, thereby improving the convergence time after topology changes (compared to what is achieved through the Spanning Tree protocol). If the HA 15 serves multiple ELANs 1, 2, it should maintain separate frame caches for the different ELANs. In order to reduce the size of the cache memory a MR 17, 18, 19 or a HA 15 may cache a hash of each frame instead of the entire frame.

In FIG. 1 it is illustrated that the moving networks 11, 12, 13 include MNNs 111, 112, 121, 131 and 132 respectively. One issue to tackle is which router(s) that should assume a default router role towards the MNNs 111, 112, 121, 131, 132 in the moving networks 11, 12, 13 in the ELAN 1 and handle the ELAN external communication for these MNNs. The main alternatives are to give this task to a MR in each moving network or to let the HA 15 handle it for the entire ELAN 1. The choice depends partly on the choice of tunneling solution. If the second alternative way of establishing the layer 2 tunnels (described above in connection with FIG. 3) is used, then a MR, from a routing point of view, has no exit point of its own from the moving network (since the regular MR-HA tunnel normally constitutes this exit point). In that case the only available choice is to let the HA 15 be the default router and handle the ELAN external traffic for all the MNNs (and MRs) in all the moving networks 11, 12, 13 of the ELAN 1.

The first and third alternative way of establishing the layer 2 tunnels (described above in connection with FIG. 2 and FIG. 4) also allow the HA 15 to be the default router for the entire ELAN 1, but in these cases there is an alternative choice, because each MR 17, 18, 19 has the possibility to send and receive ELAN external packets through the regular IP-in-IP MR-HA tunnel 21 or 36 outside the layer 2 tunnel t11. This allows each MR 17, 18, 19 to be a default router and handle ELAN external traffic. In theory, any MR 17, 18, 19 could be the default router for the entire ELAN 1. It is however more practical to let one MR in each moving network be the default router only for the MNNs in that particular moving network. Thus, a MR would advertise itself, i.e. broadcast Router Advertisements only in its own moving network.

Since it is possible that the ELAN 1 extends into the network 14 of the HA 15, it is also possible that the router 16 in the HA's network 14 acts as default router. In such case, in order to allow the HA 15 to support multiple parallel ELANs 1, 2, each such parallel ELAN 1, 2 should have a dedicated VLAN in the HA's network 14, so that the traffic in the different parallel ELANs 1, 2 can be kept separate.

The same prefix or prefixes (called Mobile network prefix MNP in the NEMO basic support protocol) should preferably be used in the entire ELAN 1 and, if applicable, be supported by all MRs 17, 18, 19. If the second alternative way of establishing the layer 2 tunnels t11, t12, t13 described above is used and the HA 15 is the default router for the entire ELAN 1, it is convenient to let the HA 15 advertise the supported prefix(es) throughout the ELAN 1 using Router Advertisements.

If the MRs 17, 18, 19 act as routers towards the MNNs, in addition to emulating layer 2 bridges, each MR 17, 18, 19 should advertise the supported prefix(es) in its own moving network 11, 12, 13 (but not through the layer 2 tunnel t11, t12, t13). However, if an administrator has chosen to let different MRs support different prefixes in their respective moving networks, then the MRs must broadcast their Router Advertisements in the entire ELAN 1.

A MR that provides the ELAN service should, if necessary, reduce the advertised MTU (Maximum Transfer Unit) size inside the moving network to cater for the overhead of layer 2 tunneling according to the present invention.

The MNNs 111, 112, 121, 131, 132 should preferably autoconfigure their IPv6 addresses (i.e. stateless address autoconfiguration described in "IPv6 Stateless Address Autoconfiguration" by S. Thomson and T. Narten, published by the IETF as RFC 2462 in December 1998) based on the prefix(es) they receive in Router Advertisements. Duplicate address detection (DAD) (described in "Neighbor Discovery for IP Version 6 (IPv6)" by T. Narten et al., published by the IETF as RFC 2461 in December 1998) should then be performed in the entire ELAN 1.

Stateful address configuration via DHCPv6 (Dynamic Host Configuration Protocol for IP version 6) is however still an option (see "Dynamic Host Configuration Protocol for IPv6 (DHCPv6)" by R. Droms et al., published by the IETF as RFC 3315 in July 2003). A DHCP server assigning an address to a MNN could be located in a MR 17, 18, 19, the HA 15 or in the node 16 in the network 14 of the HA 15. If the MR assigns the address, the address ranges that are available for the different MRs must be coordinated (unless they use different MNPs). In addition, a MR should filter and avoid forwarding DHCP messages that it receives from MNNs. These are clear disadvantages. If the HA assigns the addresses, no such coordination and filtering is needed. The MRs may then act as DHCP relay agents (and filter DHCP messages). If the node 16 in the HA's network 14 assigns the addresses, the HA 15 must act as a DHCP relay agent, unless the ELAN 1 extends into the HA's network 14, encompassing the DHCP server.

Packet filtering should preferably be employed both in the MRs 17, 18, 19 and in the HA 15, in addition to the filtering-like mechanisms provided by the Spanning Tree protocol and the MAC address learning mechanism. The filtering functions have the dual purpose of supporting the general ELAN functions and removing unnecessary network load.

The MRs 17, 18, 19 should in most cases avoid sending their Router Advertisements into the layer 2 tunnels t11, t12, t13. In addition, a MR should not forward Router Advertisements that it receives from its moving network. In case the HA 15 does not act as a router for the ELAN 1, and the MRs' Router Advertisements are confined to the MRs' respective moving network, then a MR should avoid forwarding Router Solicitations too.

Furthermore, a MR 17, 18, 19 that acts as a DHCP server or a DHCP relay agent should not forward DHCP messages on layer 2.

A MR may also discard frames that appear to be duplicates resulting from broadcast loops during transient conditions after topology changes in the ELAN 1, as described above. This measure is taken to enhance the loop avoidance mechanism of the Spanning Tree protocol.

If the HA 15 acts as a DHCP server or DHCP relay agent, it should not forward DHCP messages on layer 2. The HA 15 can also provide a "second wall" of packet filtering, e.g. blocking Router Advertisements and Router Solicitations arriving through the layer 2 tunnels t11, t12, t13, in case the filtering function for some reason fails in a MR 17, 18, 19.

Figure 6:
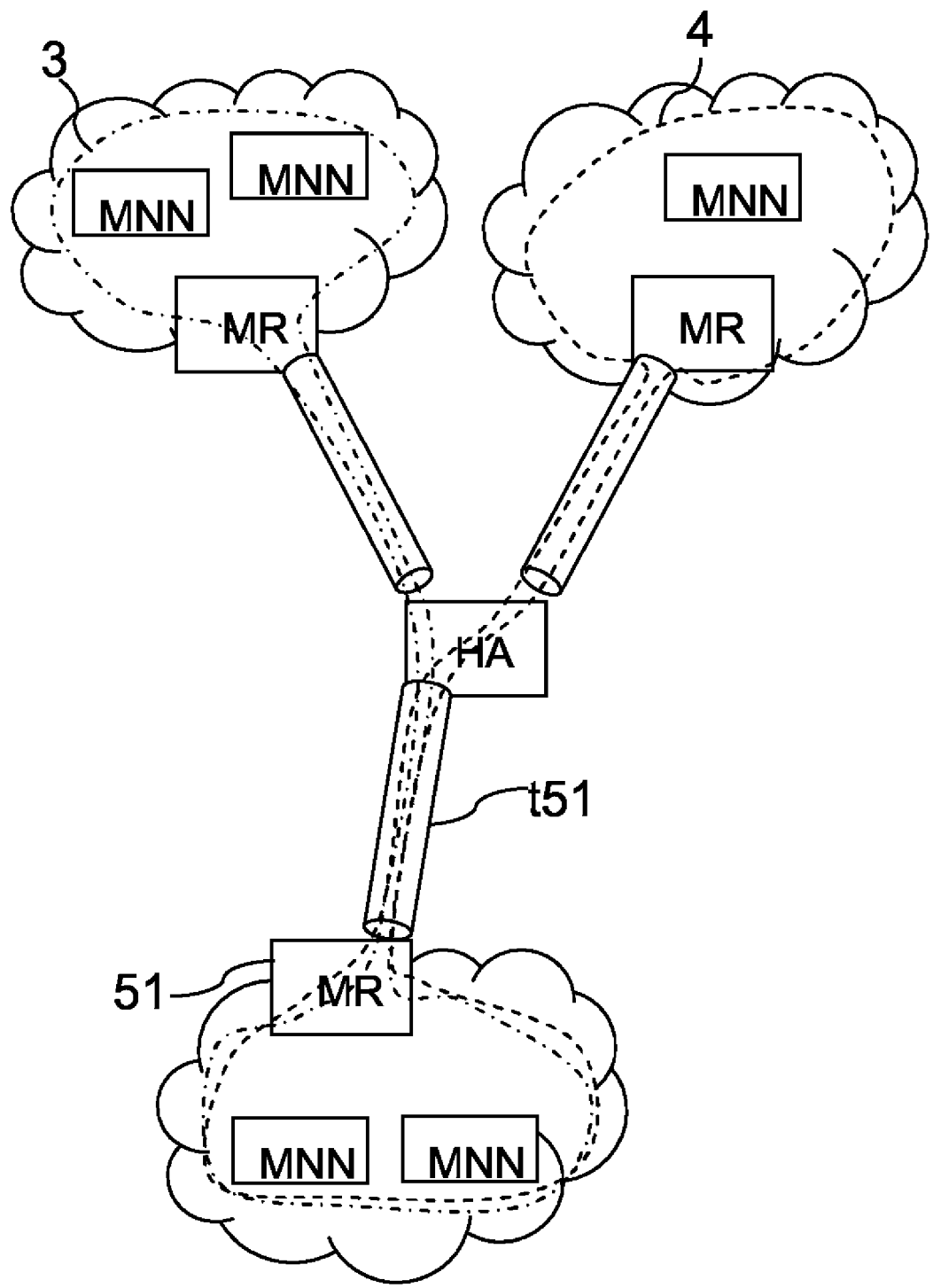
FIG. 6 is a schematic block diagram illustrating an alternative embodiment of the present invention in which two ELANs overlap.

As mentioned above two or more ELANs may overlap according to the present invention. This may occur in two ways:

1. A MR 51 is a part of more than one ELAN 3, 4 simultaneously as illustrated in FIG. 6. In the embodiment in FIG. 6 the ELANs 3, 4 are separated using VLANs in a common layer 2 tunnel t51.

Figure 7:
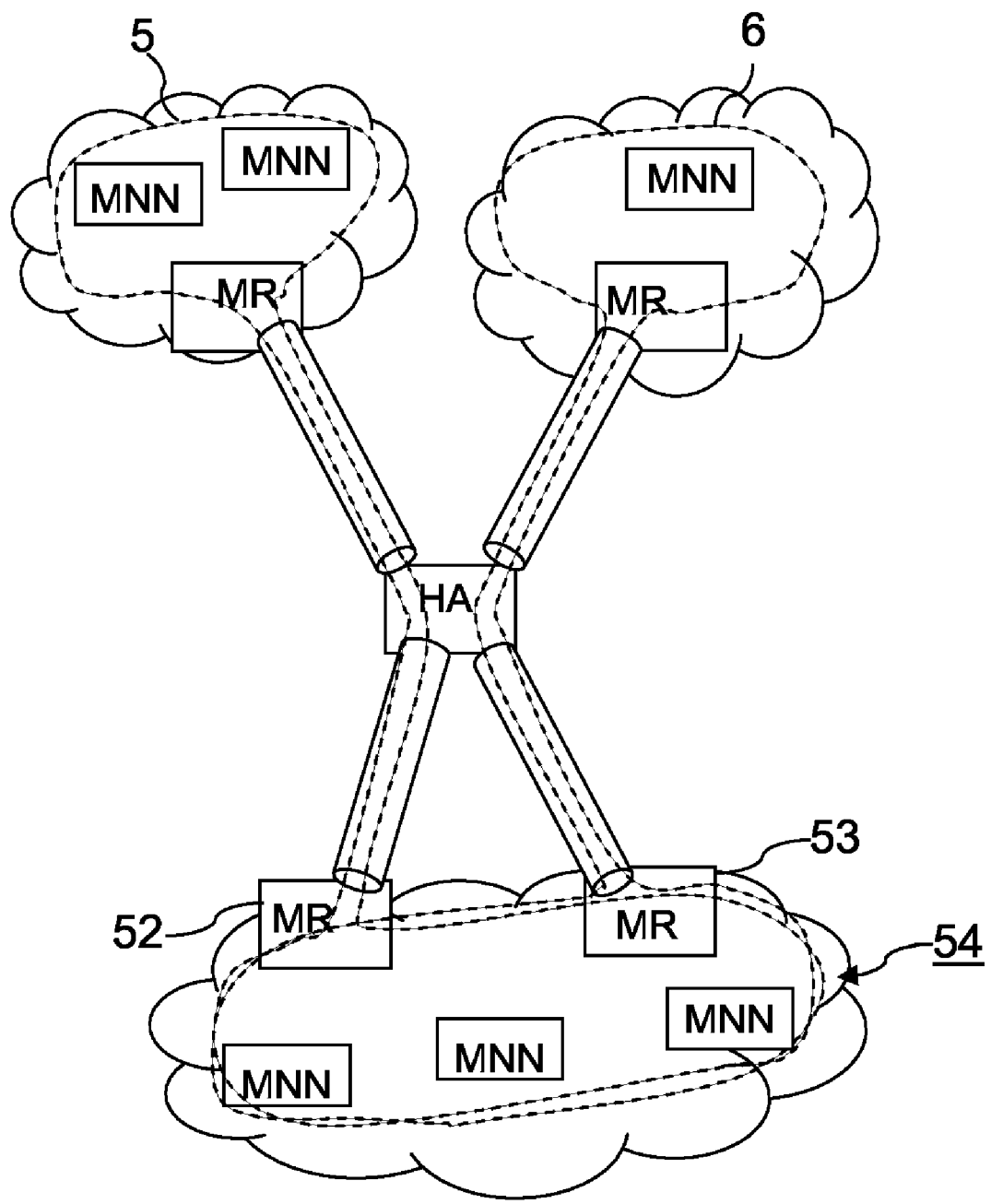
FIG. 7 is a schematic block diagram illustrating another alternative embodiment of the present invention in which two ELANs overlap.

2. Two (or more) MRs 52, 53 belonging to different ELANs 5, 6 are connected to the same moving network 54 as illustrated in FIG. 7.

If such overlapping ELANs are allowed, certain adaptations are needed. Different ELANs must be separated and communication between them should be allowed only in a controlled manner. ELANs can be separated either by using dedicated layer 2 tunnels (i.e. only one ELAN is allowed per tunnel) or by using VLANs (i.e. one VLAN for each ELAN) inside a common layer 2 tunnel (this option is used in FIG. 6).

When a MR belongs to different ELANs simultaneously (such as the MR 51 in FIG. 6), both these options are possible. When MRs belong to different ELANs (but only one ELAN each), the ELANs are inherently separated by dedicated tunnels, assuming that a MR will establish a layer 2 tunnel only for the ELAN that it belongs to. Hybrids of these two cases, i.e. multiple MRs belonging to more than one ELAN each, can also be handled with these principles.

If the ELANs extend into the network of the HA, with a router in the HA's network acting as default router for the ELANs, then, just like for parallel non-overlapping ELANs, each ELAN should have a dedicated VLAN in the HA's network as described above.

The traffic of the different ELANs should preferably be kept separate (any cross-communication should at least only be allowed in a controlled manner), in particular traffic belonging to one ELAN should not be allowed to enter a layer 2 tunnel or a VLAN dedicated to another ELAN. Thus, when a MR receives a packet from a MNN (or another MR), it must determine which ELAN the packet pertains to and then treat it accordingly. Thus, according to embodiments of the present invention, the MR looks at the prefix of the packet's source IP address and either:

- forwards the packet through its single (non-VLAN separated) layer 2 tunnel subject to the Spanning Tree and MAC address learning mechanisms,
- selects the one of its multiple layer 2 tunnels that is dedicated to the ELAN that the packet pertains to (according to its source address prefix) and forwards the packet through this (non-VLAN separated) layer 2 tunnel subject to the Spanning Tree and MAC address learning mechanisms,
- tags the layer 2 frame encapsulating the packet with a VLAN tag and forwards the packet through a VLAN separated layer 2 tunnel,
- discards the packet because it pertains to an ELAN that the MR does not belong to, or
- gives the packet a special treatment, because it contains a link-local or unspecified source IP address.

The HA may also monitor the source address prefix of the packets it receives to verify that the MR forwarding the packet did not make a mistake according to the above described principles.

If a packet received from the moving network has a link-local or unspecified source address, the MR will give it special treatment. Lacking an ELAN-specific prefix in the source address, the packet cannot be classified as belonging to a certain ELAN. The special treatment depends on the type of packet. If the packet is a Router Advertisement, the MR should in most cases by default not forward the packet at all. If the packet is a Router Solicitation and an embodiment in which Router Advertisements should be confined to a moving network is used, then the MR responds with a Router Advertisement including all its supported prefixes for all the ELANs it belongs to. If the packet is a Router Solicitation and an embodiment in which Router Advertisements should be forwarded is used, then the MR has the choice to forward the Router Solicitation in all the ELANs that the MR belongs to (i.e. in all its dedicated layer 2 tunnels or VLANs) or in a subset of the ELANs. The MR will forward all Router Advertisements it receives from the layer 2 tunnel(s), in all its ELANs (assumedly broadcast by the HA), to its moving network. Thus the node that originated the Router Solicitation will receive the Router Advertisements, periodic as well as solicited, that are broadcast in all the ELANs that are present in the moving network.

Similarly, if the HA receives multiple Router Solicitations from the same node, it could theoretically choose not to respond to it in certain ELANs. This would however not make any difference, since the node that originated the Router Solicitation will anyway receive all Router Advertisements that are broadcast in its moving network. So the default behavior for the HA would preferably be to respond to all Router Solicitations and for the MR to forward Router Solicitations in all its ELANs.

If the packet is a Neighbor Solicitation, then the MR should forward the packet in all its ELANs subject to the Spanning Tree and MAC address learning mechanisms, unless the packet is addressed to the MR itself, in which case it responds to the packet. If the packet is a Neighbor Advertisement, then the MR should forward the packet in all its ELANs subject to the Spanning Tree and MAC address learning mechanisms. If the packet is a Redirect message and an embodiment in which Router Advertisements should be confined to a moving network is used, then the MR should discard the packet. If the packet is a Redirect message and an embodiment in which Router Advertisements should be forwarded is used, then the MR should forward the packet in all its ELANs subject to the Spanning Tree and MAC address learning mechanisms. If the packet is a DHCP message and the MR does not act as a DHCP server or a DHCP relay agent, then the packet should be forwarded subject to the Spanning Tree and MAC address learning mechanisms. In this case however, as opposed to what was the case with Router Solicitations, it does matter which ELANs the MR chooses to forward the packet in. If the packet has a unicast destination address (e.g. the HA's address in one of the ELANs), e.g. a DHCP Request message, the MR should forward the packet in the ELAN that the prefix of the destination address belongs to. Otherwise, if the packet's destination address is the All_DHCP_Relay_Agents_and_Servers multicast address, e.g. a DHCP Solicit message, then the MR should forward the packet in all or a subset of the ELANs. If the MR chooses to forward the packet in only a subset of the ELANs, the consequence will be that the node that originated the packet will receive a DHCP configured address in only these selected ELANs. If all Router Advertisements in the moving network have the "Autonomous address-configuration flag" cleared for all prefixes and the "Managed address configuration" flag set, then the concerned node will not configure any other addresses than the DHCP configured addresses in the selected ELANs and a link-local address. The MR's basis for the decision of which ELANs to forward the DHCP message in could be e.g. an internal configured list, load-sharing between the ELANs or a configured policy. If the MR has already authenticated the concerned node (e.g. a MNN) when the node connected to the moving network, then the decision may be based on other information as well, e.g. authorization data from an AAA server. The default behavior should however be to forward the DHCP message in all ELANs and leave the ELAN choice to the HA.

When a HA acting as a DHCP server receives multiple copies of the same DHCP message (indicated by its transaction ID and source address, DUID (DHCP Unique Identifier) or Interface-id option) in different ELANs, it will in practice receive them one by one. Hence, unless prohibited by a policy, the HA will respond to the first copy of the messages. The response is sent only in the ELAN in which the message was received. The HA can then choose to respond or not respond to each of the subsequently received copies of the DHCP message in the other ELANs. The HA's basis for these decisions may be similar as those mentioned above for the MR (except the authentication related data).

How to deal with moving network internal, i.e. link-local, traffic when multiple ELANs overlap in the moving network is another issue. Partly depending on the underlying network technology a MR may have certain possibilities to impact/control the moving network internal traffic. The choice whether to use these possibilities and to what extent may be a policy decision.

If the moving network has layer 1 and layer 2 technologies that allow MNNs in the moving network to communicate directly with each other, then the MRs cannot affect the traffic. However, if all the link-local traffic in the moving network passes via the MR on layer 2, e.g. a WLAN (such as specified in the document IEEE 802.11 "Wireless LAN Medium Access Control (MAC) and Physical layer (PHY) Specification", published in 1999) using infrastructure network configuration with the access point acting as MR, then the MR has the possibility to impact the link-local MNN-to-MNN traffic.

A MR may for instance choose to prohibit all link-local unicast traffic between the ELANs. The MR would then monitor the source and destination IP addresses of the link-local packets. A packet with the source address prefix belonging to one ELAN and the destination address prefix belonging to another ELAN would then not be forwarded directly to its destination. Instead the packet would have to be routed on the IP layer (layer 3) before it is allowed into the ELAN of the destination node. If the MR itself acts as a router, it can perform this routing itself Otherwise the MR forwards the packet into the layer 2 tunnel of the originating ELAN, so that the default router, e.g. the HA or a router in the HA's network, can route the packet into the destination ELAN. A link-local packet for which one of the IP addresses is a link-local address would however be allowed, i.e. the MR would relay it back to the moving network and the destination node without IP layer routing, unless the MR knows that the two concerned nodes belong to different ELANs (i.e. that they have no non-link-local addresses configured in a common ELAN).

If a MR that belongs to multiple ELANs use frame caching as an additional loop avoidance mechanism as described above, it should maintain a separate frame cache for each ELAN.

What ELAN(s) a MR takes part in is a configuration issue. The MR's ELAN membership is configured in the MR, e.g. by configuring that LAN emulation should be used when connecting to a certain HA, or, in case of multiple ELANs, configured by prefix, so that different prefixes end up in separate ELANs. The MR's ELAN membership is also configured in the HA, which knows which MRs belong to an ELAN. From the HA's point of view it would also be possible to allow MRs to take part in ELANs dynamically, i.e. without configuration in the HA. As soon as a MR with a certain prefix sets up a layer 2 tunnel towards the HA, the HA would then incorporate the MR into the corresponding ELAN.

The situation is different regarding the MNNs (i.e. the non-MR nodes in a moving network). The MNNs should preferably not have to be configured to take part in an ELAN. The ELAN feature should preferably be transparent to them If a MR only belongs to a single ELAN, then all MNNs that connect to the MR automatically belongs to that ELAN. The MR could, however, have configured policies that allow only certain MNNs to connect to it (i.e. a white list) or forbid certain MNNs from connecting to it (i.e. a black list). A MR could also have a more advanced access control, employing a MNN authentication procedure involving an AAA server. Then the decision whether to allow the MNN to connect to the MR or not lies with the AAA server.

From the discussion above it can be noted that a MNN which is included in overlapping ELANs will be able to communicate in all the overlapping ELANs, unless stateful address configuration using DHCPv6 is used and the flags in the Router Advertisements prevent stateless address autoconfiguration in the MNNs. And even if such measures are taken the MNNs will be able to communicate with each other across the ELAN borders using link-local traffic (with link-local addresses) for moving network internal traffic.

In some cases there may, however, be additional means available to separate MNNs into different ELANs. If the layer 2 technology in the moving network supports VLANs, then VLANs could be used to separate MNNs belonging to different ELANs from each other, e.g. using one VLAN per ELAN (provided that the MNNs support VLANs). Yet a possibility is to use a layer 1 technology that uses point-to-point communication between the MR and the MNNs rather than a broadcast-like communication. Then the MR would have full control of which MR that communicates in which ELAN, even for moving network internal traffic.

Figure 8:
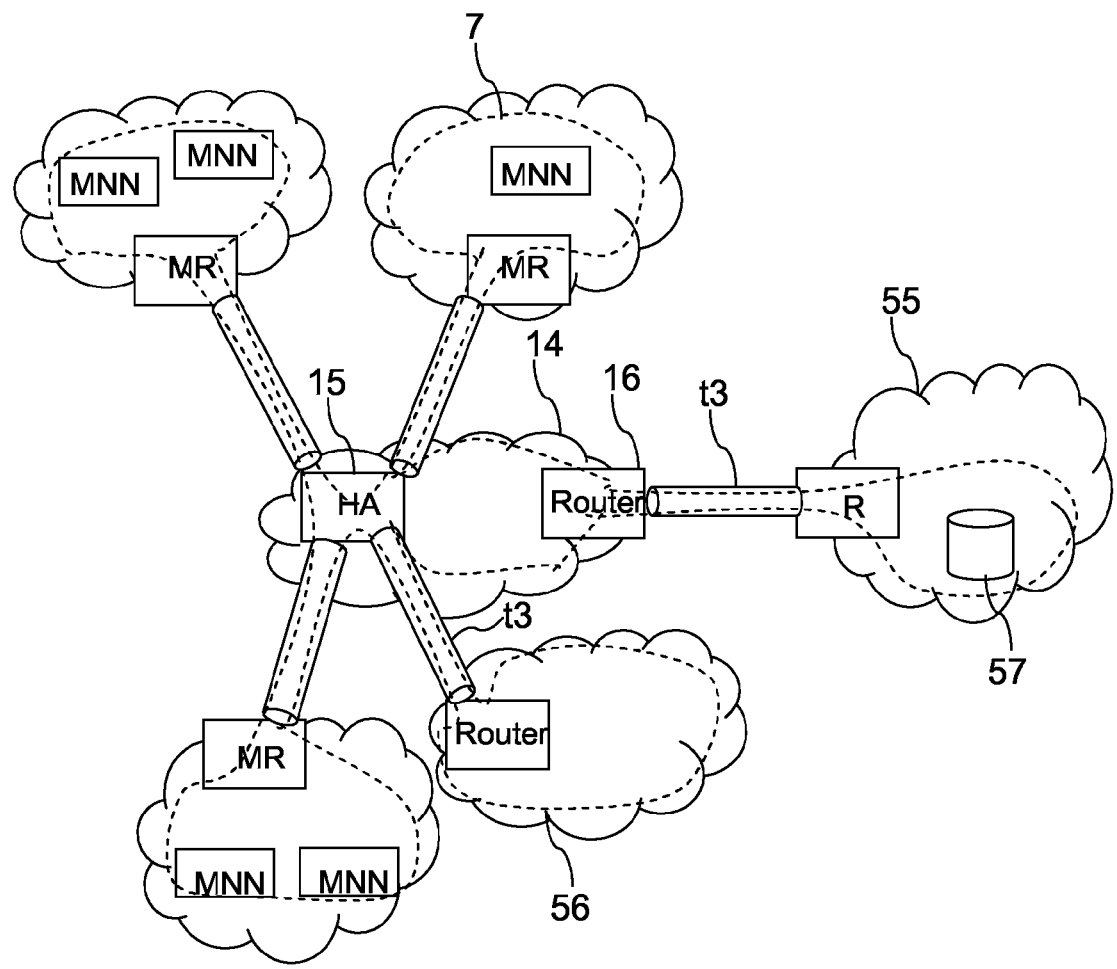
FIG. 8 is a schematic block diagram illustrating an ELAN, which is extended to incorporate networks beyond a home network, according to an embodiment of the present invention.

According to the present invention it is also possible to extend an ELAN beyond the HA and the home network, thus potentially encompassing even more servers and other nodes in the virtual home LAN environment. Thereby it is possible that the nodes in the ELAN experience even greater benefits. One or several Layer 2 tunnels t3 from the HA 15 or a router 16 in the home network 14 and/or more layer 2 bridge/switch emulating nodes could be used to incorporate other networks 55, 56 in an ELAN 7, as illustrated in FIG. 8.

An interesting scenario is when the other network 55 is a service provider's network and part of that network is included into the ELAN 7. Not only would it make the service provider's servers 57 and services available in the emulated LAN environment, thus amplifying the previously mentioned advantages, such as being able to use multicast and broadcast protocols between hosts and servers. It would also provide an environment, which would facilitate deployment of solutions for service provisioning and delivery that are similar to those being deployed in fixed broadband networks.

If an ELAN comprises more than one HA, a certain level of coordination between the involved HAs is required. Each HA will emulate a layer 2 switch, just as in the single HA case. Each HA may be an edge router for the ELAN, advertising itself as a potential default gateway. Although these Router Advertisements may be distributed in the entire ELAN, performance advantages may be gained by limiting the Router Advertisements from a HA to the moving networks connected to that HA. The reason is that in most cases it would be suboptimal for a MNN in a moving network to chose the HA of another moving network as its default gateway. Therefore the HAs may optionally distribute their Router Advertisements only to their own moving network(s) and a HA may optionally filter and block Router Advertisements from other HAs in the ELAN. However, if the HAs advertise different MNPs, then the Router Advertisements should be distributed in the entire ELAN. Each HA may also be a DHCP server, but if there are more than one DHCP server in the ELAN, their address assignments have to be coordinated (e.g. by giving them responsibility for different parts of the address range). Each HA may be a DHCP server for the entire ELAN or only for its own moving network(s). In the latter case each HA should filter DHCP messages from its moving network(s) and avoid forwarding them towards other HAs. A DHCP message arriving to a HA at another interface than a layer 2 tunnel to one of its moving networks should be blocked and disregarded (i.e. the frame should be discarded and the HA's DHCP server should ignore the DHCP message).

Two cases of multiple HAs in the same ELAN can be distinguished: multiple HAs located in the same network and multiple HAs located in different networks. In the former case the layer 2 medium in the mutual network bridges the ELAN between the HAs. In the latter case the HAs have to be interconnected by one (in case of two HAs) or more (in case of more than two HAs) layer 2 tunnels. Layer 2 tunnels may also be established between intermediate routers in order to interconnect the HAs.

An inherent feature of the proposed invention is that it can carry packets other than IPv6. For instance, IPv4 packets can also be carried between MRs and it is possible to emulate a LAN with dual stacks and even with IPv4-only MNNs. This enables use of IPv4 and dual stack moving networks based on the NEMO standard, which was defined for IPv6 only. If a terminal connects to a moving network when the moving network is disconnected from the fixed network infrastructure and functions as a stand-alone network, then the terminal may configure an IP address, e.g. a link-local address, that does not belong to the address range of the ELAN that the moving network may later belong to. If this is the case when the moving network connects to the LAN emulating HA, then a way to make the terminal change to an address belonging to the address range of the ELAN (or configure such an address in addition to a link-local address) could be that the MR (e.g. a DHCP server in the MR) sends a DHCP FORCERENEW message (described in "DHCP reconfigure extension" by Y. T'Joens et al., published by the IETF as RFC 3203 in December 2001) to the terminal, thereby forcing the terminal's DHCP client into the INIT state. If the MR is not equipped with a DHCP server, it suffices to implement the ability to send a DHCP FORCERENEW message. The subsequent DHCP communication may be handled by a DHCP server in the HA or the home network as described above.

From the above description of embodiments of the present invention it is apparent that there are several nodes that are involved and interact in the process of LAN emulation according to the present invention. These nodes are at least a HA and a MR of a moving network. These nodes must be adapted to support LAN emulation according to the present invention. The person skilled in the art will appreciate that this adaptation in most cases involves loading new software into the different nodes to support the required layer 2 frame forwarding functions and layer 2 tunnel interfaces needed to form an emulated LAN according to the invention. The person skilled in the art will also appreciate that this adaptation of the nodes also can be realized by means of hardware circuits or firmware. Examples of the software, firmware or hardware circuits that may be included in the HA 15 and MR 17 to implement the LAN emulation of the present invention are illustrated schematically as blocks in FIGS. 9 and 10 respectively.

Figure 9:
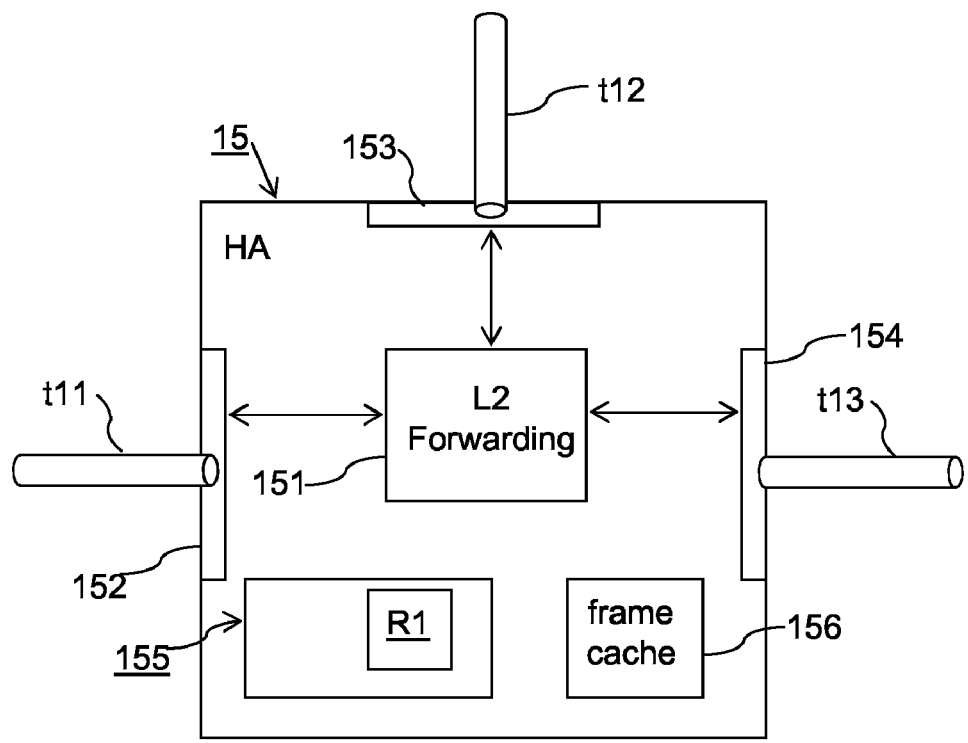
FIG. 9 is a schematic block diagram illustrating a home agent according to an embodiment of the present invention.

FIG. 9 is a schematic block diagram illustrating a possible embodiment of the HA 15 with the functional blocks that may be added according to the present invention. The HA 15 includes a layer 2 frame forwarding mechanism 151 for performing layer 2 frame forwarding to/from the layer 2 tunnels t11, t12, t13 of the ELAN 1. The HA 15 is also adapted to maintain tunnel interfaces 152, 153 and 154 to the layer 2 tunnels t11, t12, t13 respectively. The HA may also include an ELAN managing unit 155 comprising the record R1 that the HA may maintain to keep track of the tunnels and MRs that belong to the ELAN 1. The HA 15 may also include a frame cache 156 in order to be able to perform frame caching as a loop avoidance mechanism as described above.

Figure 10:
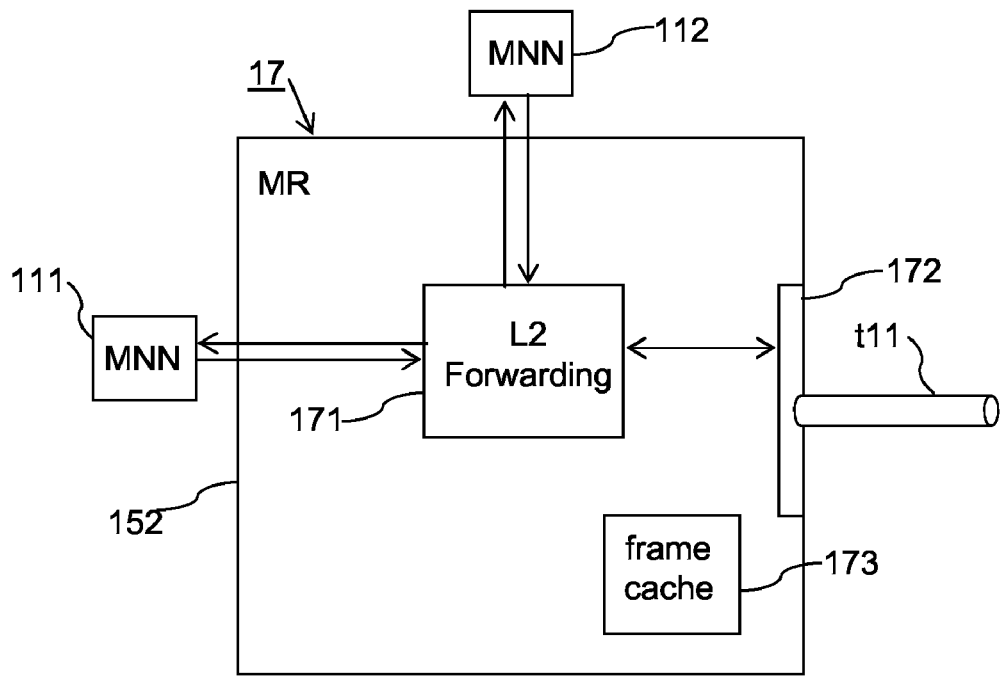
FIG. 10 is a schematic block diagram illustrating a mobile router according to an embodiment of the present invention

FIG. 10 is a schematic block diagram illustrating a possible embodiment of the MR 17 with the functional blocks that may be added according to the present invention. The MR 17 includes a layer 2 frame forwarding mechanism 171 for performing layer 2 frame forwarding to/from the layer 2 tunnel t11. The MR 17 is also adapted to maintain a tunnel interface 172 to the layer 2 tunnel t11. The MR 17 may also include a frame cache 173 in order to be able to perform frame caching as a loop avoidance mechanism as described above.

As described above the present invention enables emulated LANs to be maintained in the dynamic environment of moving networks. Moving networks that are part of an emulated LAN established according to the principles of the present invention may move (i.e. change their points of attachment to the network infrastructure), connect and disconnect in a dynamic fashion. The nodes in the moving networks may benefit from the advantages of having other nodes, servers, etc., connected to the same layer 2 network. This includes e.g. being able to use multicast and broadcast protocols, e.g. service discovery protocols, in a well-known home LAN environment.

Furthermore, by means of the present invention it is possible for an organization to keep its mobile networked devices (e.g. the PANs (Personal Area Networks) of mobile sales and marketing staff or other mobile personnel) continuously attached to the same emulated LAN.

It is also an advantage of the present invention that the nodes inside the moving networks (and other nodes in the ELAN, e.g. additional nodes in the home network) will always experience the same reachability between each other and also towards the Internet when the ELAN is established as described above.

It is advantageous that the ELAN can be extended outside the HA and the home network to incorporate other networks, such as a service provider's network. Incorporating the servers and services of a service provider's network in the ELAN increases the advantages of the ELAN in general and provides additional benefits by facilitating solutions for service provision and delivery similar to those being deployed in fixed broadband networks.

The emulated LAN provides a good representation of an administrative or organizational unit, analogous to the intranet concept. For administrative or organizational reasons, the same policies apply for nodes and their traffic internally to this unit. For instance, they will be subject to the same policies and treatment. Their internal traffic can be regarded as trusted, to some level. Their external traffic will be exposed to the same inspection and restrictions. Their traffic will be more easily administrated by a single enforcement point (e.g. a firewall).

Another advantage of the present invention is that it has no impact on the MNNs in terms of new requirements on functions or behavior. The solution is implemented solely in the involved MRs and HAs. This is an important property of the invention to avoid backwards compatibility problems and other deployment problems, since potential MNNs are numerous and hard to control in terms of implemented software, whereas MRs and HAs are few and assumedly under administrative control.

It is furthermore advantageous that the present invention is applicable both in combination with IPv6 and IPv4, and it may furthermore be possible to adapt embodiments of the present invention to future versions of the internet protocol, the NEMO basic support protocol and other corresponding protocols.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A home agent for use in a telecommunications system, comprising:
   at least one moving network each having at least one mobile router, a number of said at least one mobile router belonging to said home agent, wherein the home agent comprises a layer 2 frame forwarding mechanism;
   the home agent being part of a first emulated local area network, encompassing a first set of said at least one moving network, which first emulated local area network is formed by a first set of layer 2 tunnels that interconnects said home agent with at least one of the mobile routers of each of the moving networks of the first set of moving networks,
   the home agent maintaining a tunnel interface of each tunnel of said first set of layer 2 tunnels; and
   wherein at least one of the tunnels of the first set of layer 2 tunnels is established in parallel with a NEMO tunnel between the home agent and a mobile router, such that the layer 2 tunnel and the NEMO tunnel share the same endpoint addresses and such that one tunnel endpoint of the layer 2 tunnel is an address of the home agent and the other tunnel endpoint is a care-of address of the mobile router.

2. The home agent according to claim 1, wherein the home agent is part of a second emulated local area network, encompassing a second set of said moving networks, which second emulated local area network is formed by a second set of layer 2 tunnels that interconnect the home agent with at least one of the mobile routers of each of the moving networks of the second set of moving networks, and maintains a tunnel interface of each tunnel of said second set of layer 2 tunnels.

3. The home agent according to claim 1, wherein the home agent maintains a tunnel interface of at least one third layer 2 tunnel that interconnects the home agent and at least one node of another network outside of the home network of the home agent to extend the first emulated LAN to further encompass at least parts of the other network.

4. The home agent according to claim 1, wherein the home agent maintains a record comprising information on which layer 2 tunnels that belong to the first emulated LAN.

5. The home agent according to claim 2, wherein the home agent maintains a first record comprising information on which layer 2 tunnels that belong to the first emulated LAN and a second record comprising information on which layer 2 tunnels that belong to the second emulated LAN.

6. The home agent according to claim 1, wherein the home agent comprises a frame cache for storing each layer 2 frame that it forwards through a layer 2 tunnel for a predetermined period of time and discards a received frame that is already present in the frame cache.

7. A mobile router for use in a moving network, which mobile router comprises
   a layer 2 frame forwarding mechanism, and
   a first tunnel interface of a first layer 2 tunnel, which first layer 2 tunnel has a second tunnel interface in a home agent of the mobile router and wherein said first layer 2 tunnel belongs to a first set of layer 2 tunnels used to form a first emulated local area network that encompass a first set of moving networks and which first set of layer 2 tunnels interconnect said home agent with at least one of the mobile routers of each of the moving networks of the first set of moving networks; and
   wherein said first layer 2 tunnel is established in parallel with a NEMO tunnel between the home agent and the mobile router, such that the first layer 2 tunnel and the NEMO tunnel share the same endpoint addresses and such that one tunnel endpoint of the layer 2 tunnel is an address of the home agent and the other tunnel endpoint is a care-of address of the mobile router.

8. The mobile router according to claim 7, wherein the mobile router further comprises a second tunnel interface of a second layer 2 tunnel, which second layer 2 tunnel has a second tunnel interface in the home agent of the mobile router and wherein said second layer 2 tunnel belongs to a second set of layer 2 tunnels used to form a second emulated local area network that encompass a second set of moving networks and which second set of layer 2 tunnels interconnect said home agent with at least one of the mobile routers of each of the moving networks of the second set of moving networks.

9. The mobile router according to claim 7, wherein the mobile router comprises a frame cache for storing each layer 2 frame that it forwards through the first layer 2 tunnel for a predetermined period of time and discards a received frame that is already present in the frame cache.

10. A telecommunications system comprising:
    at least one moving network each having at least one mobile router, and
    at least one home agent to which a number of said at least one mobile router belong;
wherein the telecommunications system further comprises
    a first emulated local area network, encompassing a first set of said moving networks, which first emulated local area network is formed by a first set of layer 2 tunnels that interconnects a first home agent with at least one mobile router of each moving network of the first set of moving networks, wherein the first home agent comprises a layer 2 frame forwarding mechanism and maintains a tunnel interface of each tunnel of said first set of layer 2 tunnels,
    wherein said at least one mobile router of each moving network of said first set of moving networks comprises a layer 2 frame forwarding mechanism and maintains a tunnel interface of a single tunnel of said first set of layer 2 tunnels; and
    wherein said first layer 2 tunnel is established in parallel with a NEMO tunnel between the home agent and the mobile router, such that the first layer 2 tunnel and the NEMO tunnel share the same endpoint addresses and such that one tunnel endpoint of the layer 2 tunnel is an address of the home agent and the other tunnel endpoint is a care-of address of the mobile router.

11. The telecommunications system according to claim 10, wherein the telecommunications system further comprises
    a second emulated local area network, encompassing a second set of said moving networks, which second emulated local area network is formed by a second set of layer 2 tunnels that interconnect the first home agent with at least one mobile router of each of the moving networks of the second set of moving networks,
    wherein the first home agent maintains a tunnel interface of each tunnel of said second set of layer 2 tunnels; and
    wherein said at least one mobile router of each moving network of said second set of moving networks comprises a layer 2 frame forwarding mechanism and maintains a tunnel interface of a single tunnel of said second set of layer 2 tunnels.

12. The telecommunications system according to claim 11, wherein the first emulated LAN and the second emulated LAN overlap such that a first moving network is included in both said first set of moving networks and said second set of moving networks.

13. The telecommunications system according to claim 12, wherein separate dedicated layer 2 tunnels are employed for forwarding traffic within the first emulated LAN and within the second emulated LAN.

14. A method for local area network emulation in a telecommunications system comprising at least one moving network each having at least one mobile router, and at least one home agent to which a number of said at least one mobile router belong, which method comprises setting up a first emulated local area network, encompassing a first set of said moving networks by means of establishing a first set of layer 2 tunnels that interconnects a first home agent with at least one mobile router of each moving network of the first set of moving networks, which first set of layer 2 tunnels is established such that said first home agent maintains a tunnel interface of each tunnel of said first set of layer 2 tunnels and such that said at least one mobile router of each moving network of said first set of moving networks maintains a tunnel interface of a single tunnel of said first set of layer 2 tunnels; and wherein at least one of the tunnels of the first set of layer 2 tunnels is established in parallel with a NEMO tunnel between the first home agent and a mobile router, such that the layer 2 tunnel and the NEMO tunnel share the same endpoint addresses and such that one tunnel endpoint of the layer 2 tunnel is an address of the first home agent and the other tunnel endpoint is a care-of address of the mobile router.

15. The method for local area network emulation according to claim 14, which method further comprises setting up a second emulated local area network, encompassing a second set of said moving networks by means of establishing a second set of layer 2 tunnels that interconnect the first home agent with at least one mobile router of each of the moving networks of the second set of moving networks, which second set of layer 2 tunnels is established such that said first home agent maintains a tunnel interface of each tunnel of said second set of layer 2 tunnels and such that said at least one mobile router of each moving network of said second set of moving networks maintains a tunnel interface of a single tunnel of said second set of layer 2 tunnels.

16. The method for local area network emulation according to claim 15, wherein the first emulated LAN and the second emulated LAN are set-up to overlap such that a first moving network is included in both said first set of moving networks and said second set of moving networks.

17. The method for local area network emulation according to claim 16, wherein separate dedicated layer 2 tunnels are employed for forwarding traffic within the first emulated LAN and within the second emulated LAN.

18. The method for local area network emulation according to claim 14 wherein the a first emulated LAN, is extended to further encompass at least parts of another network outside of the home network of the first home agent, which extension of the first emulated LAN is accomplished by means of establishing at least one third layer 2 tunnel that interconnects the first home agent and at least one node of said other network.

19. The method for local area network emulation according to claim 14 wherein the first emulated LAN is extended to encompass the home network of the first home agent.

20. The method for local area network emulation according to claim 14 wherein the first emulated LAN is extended to further encompass a fourth set of moving networks, where in the first home agent is interconnected to a fourth home agent and a fourth set of layer 2 tunnels is established to interconnect the fourth home agent with each of the mobile routers of the fourth set of moving networks, wherein said fourth set of layer 2 tunnels is established such that the fourth home agent maintains a tunnel interface of each tunnel of said fourth set of layer 2 tunnels and such that each mobile router of said fourth set of moving networks maintains a tunnel interface of a single tunnel of said fourth set of layer 2 tunnels.

* * * * *

UNITED STATES PATENT AND TRADEMARK OFFICE
CERTIFICATE OF CORRECTION

| | | |
|---|---|---|
| PATENT NO. | : 8,098,668 B2 | Page 1 of 1 |
| APPLICATION NO. | : 12/516057 | |
| DATED | : January 17, 2012 | |
| INVENTOR(S) | : Rune et al. | |

It is certified that error appears in the above-identified patent and that said Letters Patent is hereby corrected as shown below:

In Column 5, Line 26, delete "invention" and insert -- invention. --, therefor.

In Column 13, Line 29, delete "itself" and insert -- itself. --, therefor.

In Column 13, Line 58, delete "them" and insert -- them. --, therefor.

In Column 20, Line 17, in Claim 18, delete "a first" and insert -- first --, therefor.

Signed and Sealed this
Tenth Day of April, 2012

David J. Kappos
*Director of the United States Patent and Trademark Office*